US009166631B2

(12) United States Patent  
Choi et al.

(10) Patent No.: US 9,166,631 B2  
(45) Date of Patent: Oct. 20, 2015

(54) SOFTWARE-DEFINED RADIO TERMINAL APPARATUS, AND METHOD FOR DISTRIBUTING AND INSTALLING RADIO APPLICATIONS

(75) Inventors: Seung Won Choi, Seoul (KR); June Kim, Incheon-si (KR); Chi Young Ahn, Gyeonggi-do (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 0 days.

(21) Appl. No.: 14/116,578
(22) PCT Filed: May 8, 2012
(86) PCT No.: PCT/KR2012/003578
§ 371 (c)(1),
(2), (4) Date: Nov. 11, 2013
(87) PCT Pub. No.: WO2012/153968
PCT Pub. Date: Nov. 15, 2012

(65) Prior Publication Data
US 2014/0064344 A1 Mar. 6, 2014

(30) Foreign Application Priority Data

May 9, 2011 (KR) .......................... 10-2011-0043646
May 9, 2011 (KR) .......................... 10-2011-0043680
May 9, 2011 (KR) .......................... 10-2011-0043683

(51) Int. Cl.
*H04B 1/38* (2015.01)
*H04B 1/00* (2006.01)
*G06F 9/445* (2006.01)
*H04W 88/02* (2009.01)
*H04W 4/00* (2009.01)

(52) U.S. Cl.
CPC ................ *H04B 1/0028* (2013.01); *G06F 8/61* (2013.01); *H04W 4/001* (2013.01); *H04W 88/02* (2013.01)

(58) Field of Classification Search
USPC .......... 375/219–220, 222, 257; 717/140, 149, 717/178
See application file for complete search history.

(56) References Cited

U.S. PATENT DOCUMENTS 7,480,489 B2 * 1/2009 Eslick et al. ................... 455/72
2005/0176455 A1 * 8/2005 Krishnan et al. ............ 455/522
(Continued)

FOREIGN PATENT DOCUMENTS

| JP | 2006-072414 A | 3/2006 |
| WO | 2010/026292 A1 | 3/2010 |
| WO | 2010/141448 A1 | 12/2010 |

OTHER PUBLICATIONS

International Search Report mailed Nov. 29, 2012; PCT/KR2012/003578.

*Primary Examiner* — Khanh C Tran
(74) *Attorney, Agent, or Firm* — Ladas & Parry LLP

(57) ABSTRACT

According to the present invention, a software-defined radio terminal apparatus is a software-defined radio terminal apparatus which is adaptively constituted based on radio applications, and may comprise a storage unit, a microprocessor, and a baseband accelerator. The microprocessor reads, from the storage unit, a code, including a radio controller layer and a baseband driver layer, and executes the code, wherein the radio controller layer delivers a control command for controlling the baseband accelerator and information to be transmitted, from an upper layer to the baseband accelerator, and delivers the information received from the baseband accelerator to the upper layer, wherein the baseband driver layer provides interface between the radio controller layer and the baseband accelerator. In addition, the microprocessor is configured to load at least one functional block required for the implementation of a radio application from the storage unit to the baseband accelerator, and the functional block loaded to the baseband accelerator includes a baseband control functional block for controlling the baseband accelerator in real time.

14 Claims, 11 Drawing Sheets

(56) References Cited

U.S. PATENT DOCUMENTS

2006/0043164 A1* 3/2006 Dowling et al. ............. 235/375
2009/0279699 A1 11/2009 Noda
2011/0095826 A1* 4/2011 Hadjichristos et al. ....... 330/279
2012/0096445 A1* 4/2012 Berg et al. ..................... 717/140
2012/0317590 A1* 12/2012 Chae et al. .................... 719/328

* cited by examiner

SOFTWARE-DEFINED RADIO TERMINAL APPARATUS, AND METHOD FOR DISTRIBUTING AND INSTALLING RADIO APPLICATIONS

TECHNICAL FIELD

Example embodiments of the present invention relate in general to the field of software defined radio terminal apparatuses and a method of distributing and installing radio applications for the same, and more specifically to the field of a software defined radio terminal, in which the radio applications are executed independently of a modem chip embedded in the terminal, and a method of distributing and installing the radio applications for the same.

BACKGROUND ART

As communication technology advances, various new kinds of radio applications are being used as adapted for tastes and objectives of users. The most of radio applications, such as a Long Term Evolution (LTE), a Wide-band Code Division Multiple Access (WCDMA), a Worldwide Interoperability for Microwave Access (WiMAX), a Global System for Mobile Communications (GSM), may operate on radio terminals by interworking with a modem embedded in the radio terminal. a In order to make it possible that a radio application controls the modem, a customized module should be developed based on understanding unique instructions of each modem designed by various modem manufactures or having various models. This situation leads to a result that a specific application can be executed on a specific modem designed by a specific manufacturer, or even on a specific model of modem designed by the specific manufacturer. To overcome the above-mentioned problem, different control instruction codes customized for various kinds of modems should be comprised in the radio application, or different executable file for each modem should be built and distributed.

However, since it is practically impossible to optimize the radio application to all the various kinds of modem hardware currently available in the market currently by the above-mentioned methods, there is a problem that a great manpower is needed to develop a radio application.

DISCLOSURE

Technical Problem

Accordingly, example embodiments of the present invention are provided to substantially obviate one or more problems due to limitations and disadvantages of the related art.

Example embodiments of the present invention provide a software defined radio terminal apparatus which can support a radio application to operate independently of a modem chip.

Example embodiments of the present invention also provide a method of distributing a radio application independent on a modem chip to the radio terminal apparatus.

Example embodiments of the present invention also provide a method of installing a radio application independent on a modem chip into the radio terminal apparatus.

Technical Solution

In some example embodiments according to the present invention, a radio terminal being configured according to a radio application is provided, wherein the radio terminal includes a storage in which at least one functional block is installed, a compiler, a microprocessor, and at least one baseband accelerator, wherein the microprocessor is configured to read out codes including a radio controller layer transferring control commands for controlling the baseband accelerator and information to be transmitted from an upper layer to the baseband accelerator and transferring information received from the baseband accelerator to the upper layer and a baseband driver layer enabling an interface between the radio controller layer and the baseband accelerator from the storage, and to execute the codes, wherein the microprocessor is further configured to load the at least one functional block from the storage to the at least one baseband accelerator for performing the radio application, wherein the compiler is configured to compile the at least one functional block in form of source code into an executable code, and install the executable code into the storage, and wherein the at least one function block loaded into the at least one baseband accelerator includes a baseband control functional block controlling the at least one baseband accelerator in real time.

In another example embodiments according to the present invention, a method of distributing a radio application, the method may include encrypting user-defined codes defining functional blocks for implementing a specific radio application; generating an application package including the user-defined codes, radio controller codes configured to transfer control commands for controlling the functional blocks and information to be transmitted from an upper layer to the functional blocks, and to interface with an Operating System (OS) of a terminal, a pipeline configuration metadata specifying the functional blocks for implementing the specific radio application and connections between the functional blocks for implementing the specific radio application; and uploading the generated application package to an application distribution server.

In still another example embodiment according to the present invention, a method of installing a radio application, performed in a software defined radio terminal, the method may include downloading, from a distribution server, an application package including user-defined codes defining functional blocks for implementing the radio application, radio controller codes configured to transfer control commands for controlling the functional blocks for implementing the radio application and information to be transmitted from an upper layer to the functional blocks, and to interface with an Operating System (OS) of a terminal, a pipeline configuration metadata specifying the functional blocks for implementing the specific radio application and connections between the functional blocks for implementing the specific radio application; installing the radio controller codes and the user-defined codes into a storage of the terminal, by referring the pipeline configuration metadata; and decoding the use-defined codes when the user-defined codes are encrypted.

Advantageous Effects

When a software defined radio terminal apparatus according to the present invention, as described above, is used, the same application may be executed in terminals having modem chips with different structures thorough a standard baseband API. Also, by providing various digital signal processing algorithms needed in wireless digital communication based on the standard baseband API for optimal digital signal processing, manufacturers of modem hardware may select hardware or software implementation according to complexity and power consumption of each block included in the standard baseband API, and producers of radio applications may produce radio applications which are independent of the modem hardware using the standard baseband API. Also, various extensions of the baseband API may be possible by providing user-defined type blocks to implement functions not included in the standard baseband API.

MODES OF THE INVENTION

Figure 1:
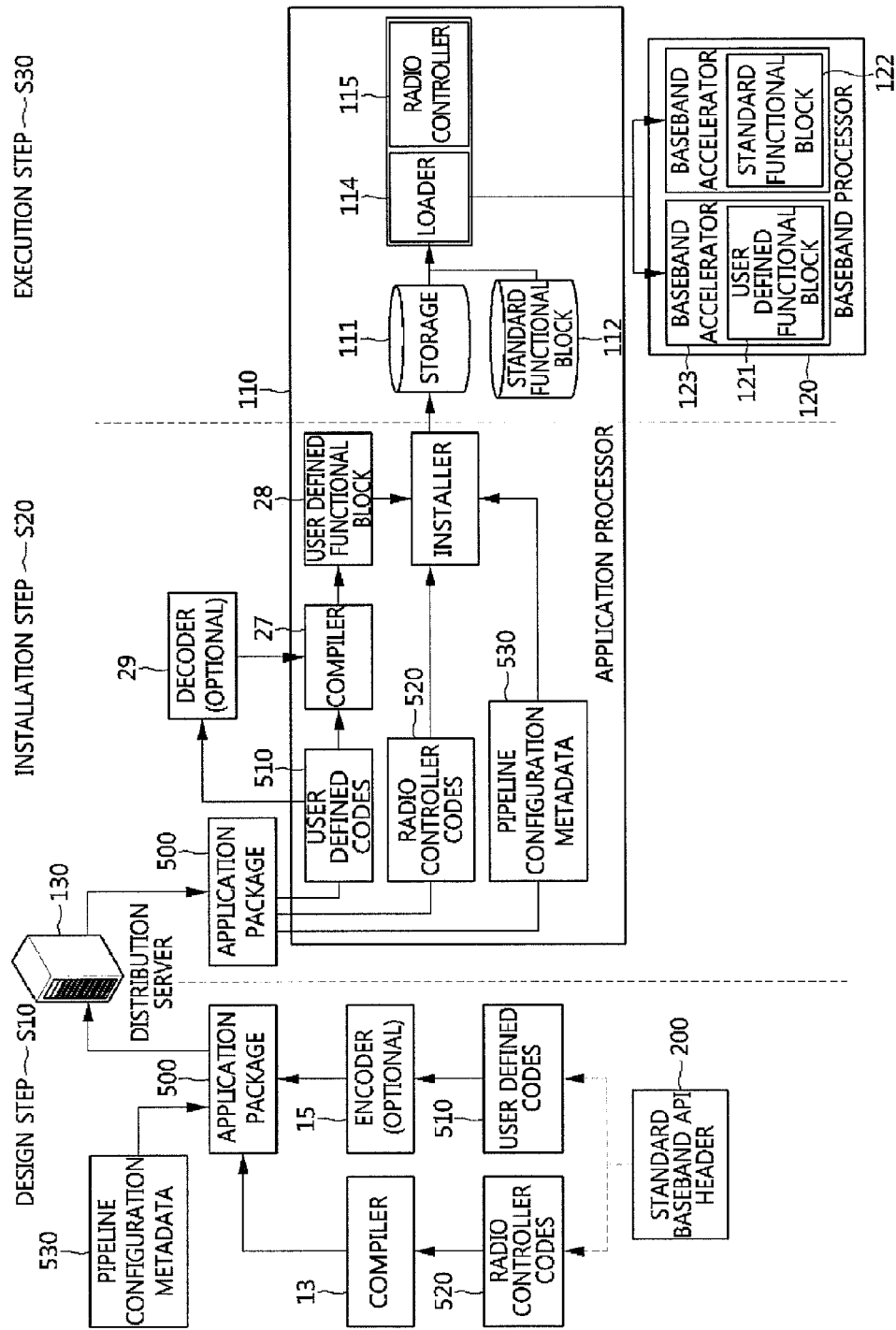
FIG. 1 is a view to show a procedure in a case that user-defined codes included in the application are distributed and executed in source code form.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises", "comprising,", "includes," and/or "including", when used herein, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Hereinafter, preferred embodiments according to the present invention will be described in detail with reference to the accompanying drawings.

Figure 2:
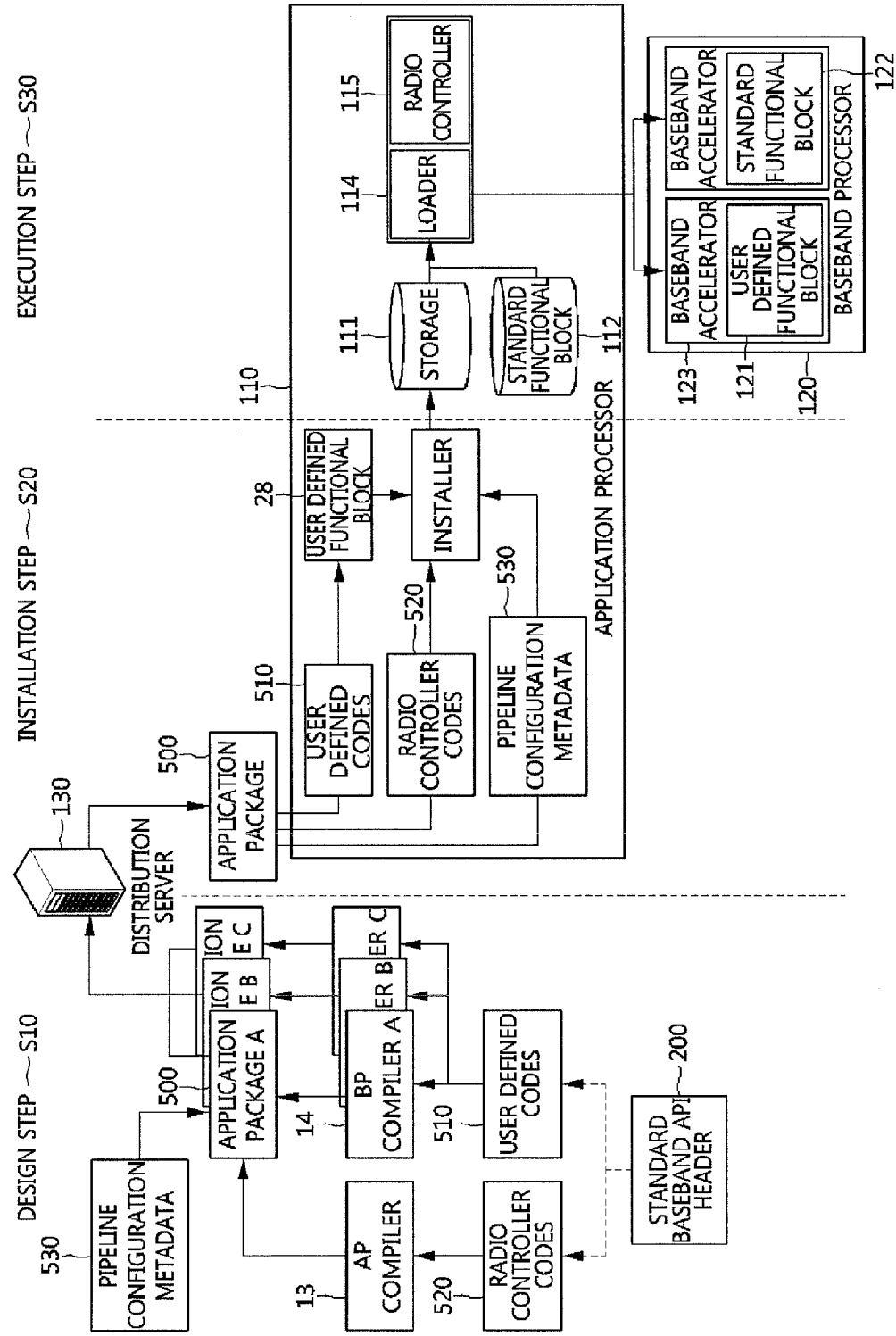
FIG. 2 is a view to show a procedure in a case that the user-defined codes are distributed and executed in executable codes.

FIG. 1 and FIG. 2 are conceptual block diagrams to explain a constitution of a radio application and procedures from distribution and execution of the radio application according to the present invention, FIG. 1 is a view to show a procedure in a case that user-defined codes included in the application are distributed and executed in source code form, and FIG. 2 is a view to show a procedure in a case that the user-defined codes are distributed and executed in executable codes.

Referring to FIG. 1 and FIG. 2, the procedure of distribution and execution of the radio application according to an example embodiment of the present invention may comprise three steps—a design step (S10), an installation step (S20), and an execution step (S30).

The design step (S10) is a step of producing the radio application. In the design step, a supplier of the radio application may generate a radio application package 500 including radio controller codes and user-defined codes for implementing the radio application by using a standard baseband application programming interface (API) header 200 defining a standard baseband interface.

At this time, the radio controller codes 520 may be included in the radio application package 500 in executable code form through a compiler 13. Also, as shown in FIG. 1, in a case that the user-defined codes are distributed in source code form, the user-defined codes may be distributed in encrypted source code form through an encryption procedure performed by an encoder 15. If the user-defined codes 510 are distributed in source code form, the user-defined codes may be compiled in a terminal which will execute the user-defined codes, and thereby device-independency of the user-defined codes may be achieved.

Meanwhile, as shown in FIG. 2, when the user-defined codes 510 may be distributed in executable codes which can be directly executed in terminal, one of various compilers 14 may compile the user-defined codes into executable codes suitable for an execution environment of the terminal, and make the executable codes being included in the application package 500.

The radio application package 500 generated according to the above-described procedure may be uploaded to a distribution sever 130, and then downloaded to a terminal desiring to use the corresponding radio application.

The installation step (S20) is a step of downloading the radio application package 500 stored in the distribution server 130, and installing the radio application by using the downloaded radio application package 500. At this time, the user-defined codes 510, the radio controller codes 520 and the pipeline configuration metadata 530 included in the radio application package 500 may be installed in an application processor layer 110 or a baseband processor layer 120.

Here, as shown in FIG. 1, if the user-defined codes are in source code form, the user-defined codes may be complied and generated into at least one executable user-defined functional block 28 by a compiler 27. If the user-defined codes are encrypted, the user-defined codes may be complied after being decoded by a decoder 29. On the other hand, if the user-defined codes are in executable code customized for a terminal, the compiling shown in FIG. 2 is not necessary.

The execution step (S30) is a step of actual execution of the installed radio application, and the actual wireless communication may be performed by loading and executing the executable codes installed for processing radio signals through the application processor 110 and the baseband processor 120, based on information within the radio application.

For example, when command instructing an execution of the radio application installed in terminal is received, a loader 114 may determine which blocks are needed for performing the radio application by referring to the pipeline configuration metadata 530. Also, the radio controller 520 and the user-defined functional blocks 28 may be loaded from a storage 111 of terminal. Also, the loader 114 may load the radio controller codes 520 to the application processor 110 or the baseband processor 120, and load the user-defined functional block 121 and standard functional block 122 into the baseband accelerator 123 by referring to the pipeline configuration metadata 530.

Figure 3:
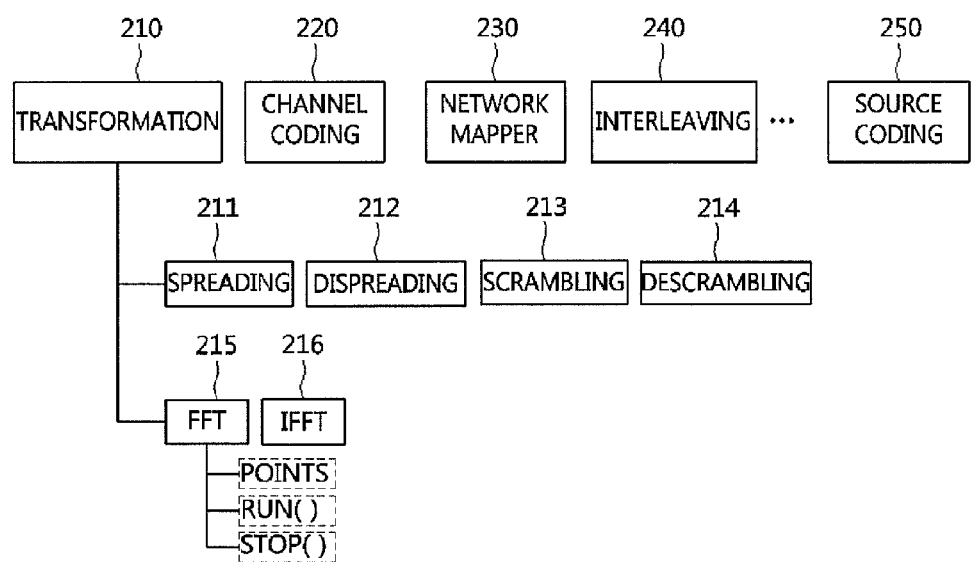
FIG. 3 is a conceptual diagram to an example standard baseband interface according to an example embodiment of the present invention.

FIG. 3 is a conceptual diagram to an example standard baseband interface according to an example embodiment of the present invention.

Referring to FIG. 3, a standard baseband interface is an application programming interface (API) standardizing digital signal processing algorithms needed for baseband domain in modem, and the standard interfaces 210~250 and the standard functional blocks 211~214 are shown as an example.

As a type of the standard interface, the standard interface may include a transformation 210, a channel coding 220, a network mapper 230, an interleaving 240, and a source coding 250 and so on. Also, as standard functional blocks for the transformation 210, a spreading 211, a dispreading 212, a scrambling 213, a descrambling 214, a Fast Fourier Transform (FFT) 215 and an Inverse Fast Fourier Transform (IFFT) 216 may be defined.

For example, Input/Out data through the FFT 215, properties of the data, and member functions may be defined for the FFT 215. Also, an object-oriented design of radio application may be made possible by assigning common properties to functional blocks having the same type.

Meanwhile, in the example embodiments of the present invention, a standard application programming interface (API) header file which is written in high-level language according to the above-described standard baseband interface may be used. Therefore, a developer of radio application may develop radio applications by referring to the standard interface API header.

An Example Embodiment of Constitution of Software-Defined Radio Terminal

Figure 4:
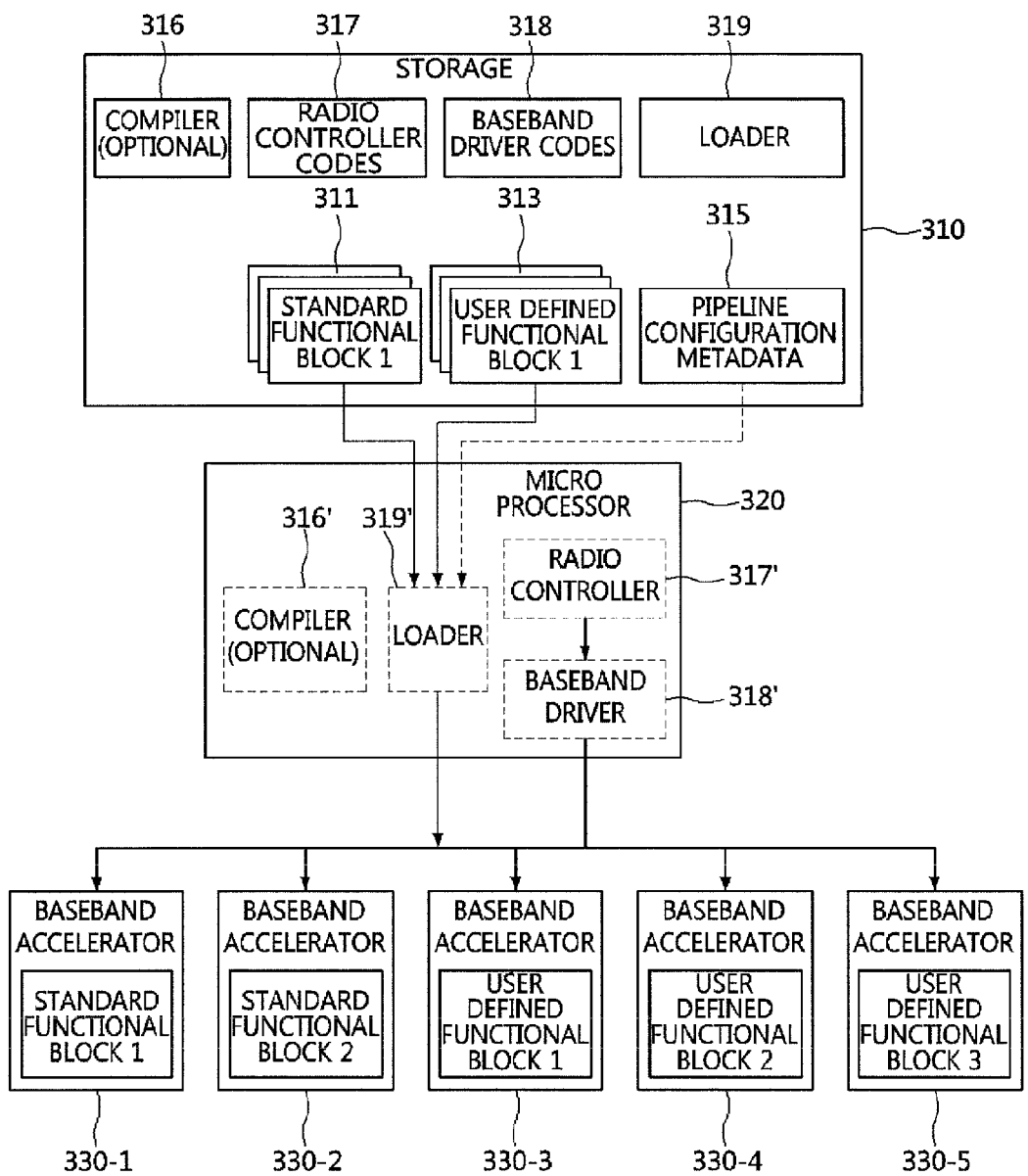
FIG. 4 is a block diagram to show a constitution of software-defined radio terminal according to an example embodiment of the present invention.

FIG. 4 is a block diagram to show a constitution of software-defined radio terminal according to an example embodiment of the present invention.

Referring to FIG. 4, a software-defined radio terminal according to an example embodiment of the present invention may comprise a storage 310 configured to store user-defined functional block codes 313, a pipeline configuration metadata 315, radio controller codes 317, baseband driver codes 318, and a loader 319, a microprocessor 320 configured to read out a compiler 316, the radio controller codes 317, the baseband driver codes 319 and the loader 319 from the storage 310 and to execute them, and a plurality of baseband accelerators 330.

Hereinafter, by referring to FIG. 4, the constitution of the software-defined radio terminal according to an example embodiment of the present invention, and relation of connections between the components of the terminal will be explained in detail.

The standard functional blocks 311, the user-defined functional blocks 313, the pipeline configuration metadata 315, the compiler 316, the radio controller codes 317, the baseband driver codes 318, and the loader 319 may be stored in the storage 310. Thus, the microprocessor 320 is configured to readout the codes from the storage and execute the codes.

Here, the user defined functional blocks 313, the pipeline configuration metadata 315, and the radio controller codes 317 may be downloaded from an application server and installed to the storage 310.

In this case, the downloaded user-defined functional blocks may be in source code form, in intermediate representation (IR) form, or in executable code form. If the downloaded user-defined functional blocks are in source code form, the compiler 316 executed in the microprocessor 320 may compile the user-defined functional blocks into executable codes for the terminal and store the executable codes in the storage 310. If the downloaded user-defined functional blocks are executable codes already compiled suitable for the terminal, the user-defined functional blocks may be installed in the storage 310 without any further converting procedures.

Here, the storage 310 may be implemented as a Non-Volatile memory such as flash memory device, or a Volatile memory such as D-RAM or S-RAM. The storage is a component storing the user-defined functional blocks 313, the pipeline configuration metadata 315, the compiler 316, the radio controller codes 317, the baseband driver codes 318, and the loader 319. Thus, the microprocessor is configured to readout the codes to be executed from the storage and execute the codes.

For example, volatile memory constituting the storage 310 is a component which may be mapped to a memory space (that is, an address space) of the microprocessor 320, may readout the components to be executed (such as those of the radio controller layer and the baseband driver layer) from the non-volatile memory and store them in it, and may make the microprocessor being capable of executing them. Here, a 'layer' may mean a set of software modules or a set of functions in an aspect of software.

However, a case that non-volatile memory is directly mapped to the memory space of the microprocessor 320 is also possible, and in this case, the microprocessor may execute codes stored in non-volatile memory directly on it.

The standard functional blocks 311 may be functional blocks to support standardized signal processing functions (such as, a DFT, a IDFT, a FFT, a IFFT, a channel coding, and an interleaving), which have been written based on the predefined standard baseband interface. Therefore, the standard functional blocks 311 may be initially installed in the terminal according to the present invention, or provided to users through firmware or software upgrade.

The user-defined functional blocks 313 may be functional blocks which are provided by supplier of radio application as explained above, and are downloaded from the application server and installed to the storage 310 by the user.

The pipeline configuration metadata 315 may be at least one data file in predetermined format which describes connections between functional blocks needed for implementing a radio application desired to be executed, and initial values of attributes of each functional block.

On the other hand, the user-defined functional blocks 313 may include baseband digital signal processing function which is not implemented in the standard functional block. That is, the standard functional block may be defined in the standard baseband API header 200, and the supplier of radio application may constitute the user-defined functional blocks 315 and the pipeline configuration metadata by referring the standard baseband API header 200.

The radio controller 317' may be a component performed by reading out radio controller codes installed in the storage and executing the radio controller codes by the microprocessor. The radio controller is executed not in real time, and has a role of receiving control commands suitable for radio signal according to each radio application and transferring them to the baseband accelerator by using the standard baseband interface.

Also, the radio controller 317' may have a responsibility of interfacing between a user layer and the baseband layer. That is, the radio controller receives receive data from the baseband accelerator and transfers the received data to a network stack (omitted in FIG. 04), and transfers transmit data from the network stack to the baseband accelerator. On the other hand, when context information are required to be transferred to upper layer, the context information may be transferred from corresponding functional block to the upper layer via the radio controller. Here, the upper layer may be a user application.

Here, the context information may be transferred by a context information interface, and the context information interface may be a predefined interface needed for transferring the context information generated in functional block wanting to transfer context information from the functional block to the upper layer, which is used by the radio controller.

The microprocessor 320 may be configured to read out the radio controller codes 317 for transferring control commands controlling the baseband accelerator 330 according to application to be executes from the storage 310, and execute them. Also, the codes including the baseband layer may be read out from the storage 310 and executed by the microprocessor 320. At this time, the baseband driver 318 may be configured to take a role of enabling interfacing between the radio controller and the baseband accelerator.

Also, the microprocessor 320 may perform reconfiguration of the baseband accelerator by downloading the user-defined functional blocks 313 into the baseband accelerator, so that various applications can be executed in the terminal of the present invention.

For this, as shown in FIG. 4, at least one functional block 311 and 313 may be configured to be downloaded to the baseband accelerator 330 from the storage 310. Here, the functional blocks needed for performing algorithm may be allocated in the baseband accelerator 334 via the loader 319' by referring the pipeline configuration metadata 315.

The loader 319' may be a program which is loaded from the storage and executed by the microprocessor, and may be included in the baseband driver 318' according to other example embodiment. That is, the loader 319' may load all the standard functional blocks 311 and user-defined functional blocks 313 which are specified in the pipeline configuration metadata 315 into the baseband accelerator 330 and make them be executed by the baseband accelerator 330.

Meanwhile, the functional blocks loaded to the baseband accelerator may include a baseband control functional block controlling the baseband accelerator in real time. In this case, the loader 319' may configure a pipeline defining an operation sequence of the loaded functional blocks based on the pipeline configuration metadata, and transfer configuration information of the pipeline to the baseband control functional block so that the baseband control functional block controls the baseband accelerator according to the transferred pipeline configuration information.

Configuration of Radio Application and Distribution of Radio Application

Hereinafter, a configuration and a procedure of distributing radio application for a software defined radio terminal according to an example embodiment of the present invention will be explained.

Figure 5:
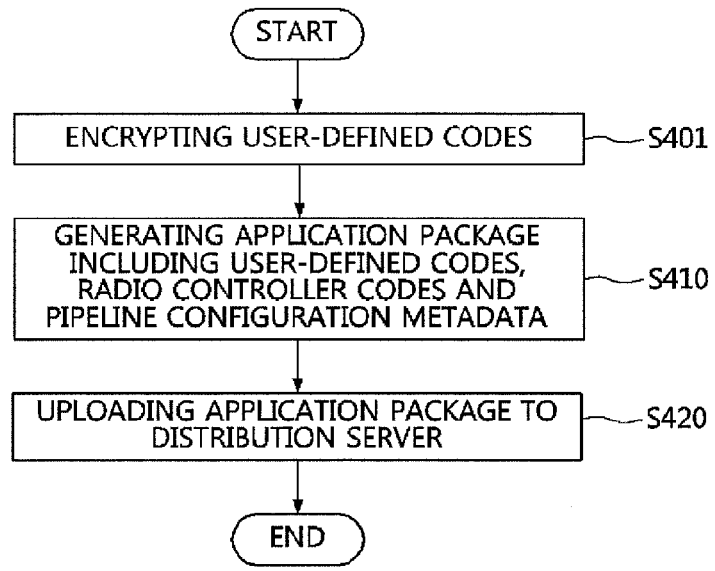
FIG. 5 is a flow chart to show a procedure of distributing a radio application according to an example embodiment of the present invention.
Figure 6:
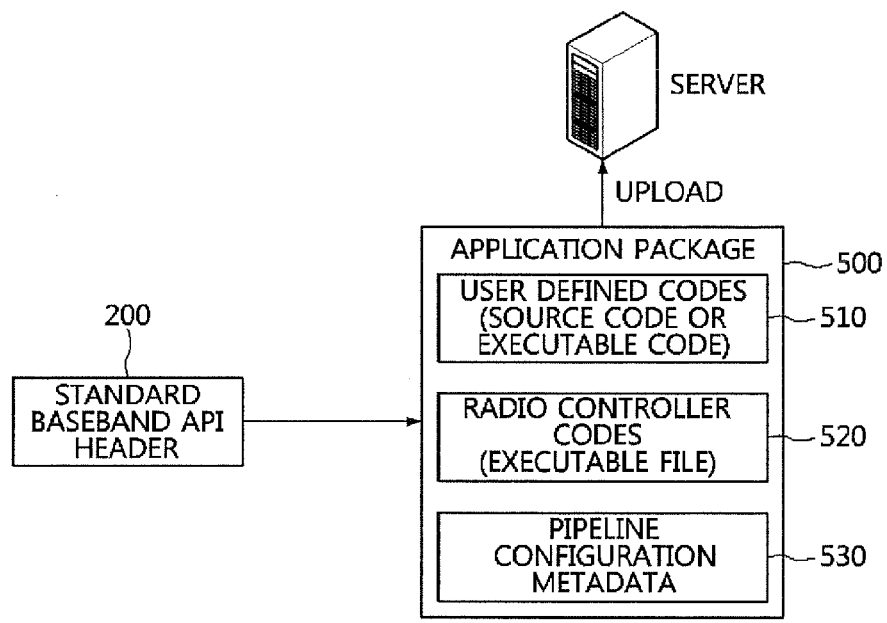
FIG. 6 is a block diagram to show a procedure of generating a radio application according to an example embodiment of the present invention.

FIG. 5 is a flow chart to show a procedure of distributing a radio application according to an example embodiment of the present invention, and FIG. 6 is a block diagram to show a procedure of generating a radio application according to an example embodiment of the present invention.

Referring to FIG. 5, a procedure of distributing a radio application according to an example embodiment of the present invention may be configured to include a step of encrypting user-defined codes S401, a step of generating application package S410, and a step of distributing application package S420.

Also, the step of generating application package S410 may include a step of generating and compiling user-defined codes S411, a step of generating and compiling radio controller codes S413, a step of generating pipeline configuration metadata, and a step of generating package S417.

Meanwhile, referring to FIG. 6, the radio application according to an example embodiment of the present invention may be generated from an application package including user-defined codes 510, radio controller codes 520, pipeline configuration metadata 530.

Hereinafter, referring to FIG. 5 and FIG. 6, each step of the distribution procedure of radio application according to an example embodiment of the present invention will be explained in detail.

The step of encrypting user-defined codes S401 is a step of encrypting the user-defined codes to be included in a radio application package. The user-defined codes may be distributed in source code form, in intermediate representation (IR) form, or in executable code form, according to selection of radio application provider. In the case that the user-defined codes are distributed in source code form, it is desirable that the user-defined codes are written in standard languages in order to be compiled in various terminals. Meanwhile, in the case that the user-defined codes are distributed in source code form, since source codes of the user-defined codes may be exposed, the user-defined codes may be encrypted before distribution in order to prevent exposure of source codes.

The step of generating application package S410 is a step of generating a radio application package including radio application to be executed in a software defined radio terminal. The application package may comprise, as shown in FIG. 6, the user-defined codes 510, the radio controller codes 520, and the pipeline configuration metadata 530.

Here, the user-defined codes 510 are codes defining functional block needed for implementing a radio application to be executed, and the radio controller codes 520 are codes written for controlling functional blocks needed for implementing the radio application to be executed. Also, the functional blocks defined by the user-defined codes are related to implementations of digital signal processing functions which are not implemented in the standard functional blocks defined in the standard baseband API header 200.

On the other hand, the user-defined codes 510 may be constituted as one of codes executable directly in baseband accelerator of the terminal which the application package 500 is installed to, codes in source code form which needs to be compiled for execution, and executable codes.

Therefore, if the user-defined codes are in executable code form, the user-defined codes may be codes compiled by various compilers for various terminals.

In the radio controller codes 520, codes for interfacing with an operation system of the terminal, and for controlling functional blocks needed to implement a radio application demanded. The radio controller codes 520 may be codes complied into executable codes by a compiler.

Meanwhile, the pipeline configuration metadata 530 may define functional blocks needed for implementing corresponding radio application, and connections between the functional blocks. Also, the pipeline configuration metadata 530 may include information on connections between the standard functional blocks included in the standard baseband API header 200 and the functional blocks defined by the user defined codes 510, and information on initial configuration values for attributes of each of the functional blocks.

The user-defined codes 510, the radio controller codes 520, and the pipeline configuration metadata 530, which have been generated in the above-described manner, may be uploaded to a server, and may be downloaded to the terminal wanting to use the corresponding radio application and installed to the terminal, in form of application package 500.

In the step of distributing application package S420, the application package which has been in the above-described manner may be uploaded to a radio application distribution server, and downloaded to a software defined radio terminal wanting the corresponding radio application.

An Example Embodiment of a Method of Installing Radio Application

Hereinafter, a procedure of installing radio application according to an example embodiment of the present invention will be explained.

Figure 7:
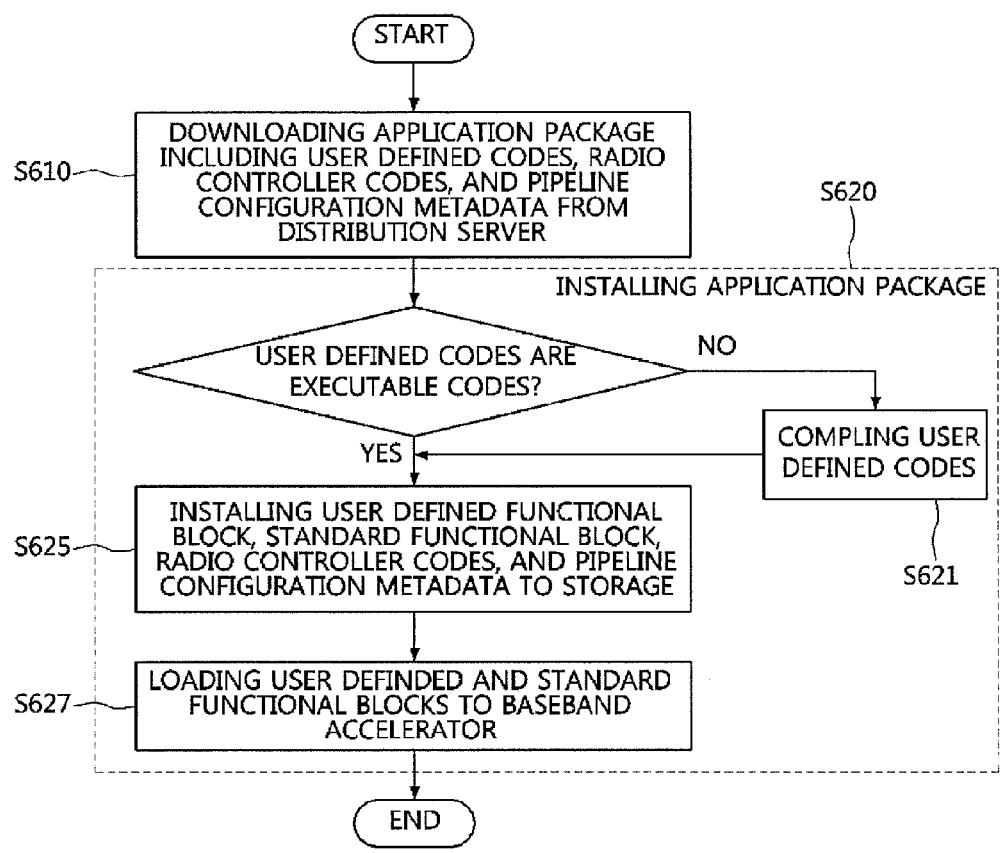
FIG. 7 is a flow chart to show a procedure of installing radio application according to an example embodiment of the present invention.

FIG. 7 is a flow chart to show a procedure of installing radio application according to an example embodiment of the present invention.

Referring to FIG. 7, the procedure of installing radio application according to an example embodiment of the present invention may be configured to include a step of downloading application package S610 and a step of installing application package S620.

Hereinafter, referring to FIG. 7, each step of the installation procedure of radio application according to an example embodiment of the present invention will be explained in detail.

The step of downloading application package S610 is a step of downloading radio application to be executed in software defined radio terminal from a distribution server. In the step of downloading application package S610, as shown in FIG. 6, the application package 500 comprising the user defined codes 510, the radio controller codes 520, and the pipeline configuration metadata 530 may be downloaded from the distribution server to the software defined radio terminal.

The step of installing application package S620 is a step of installing the application package downloaded from the distribution server to the terminal as a form executable by the terminal, and may include a step of compiling the user defined codes S621, a step of installing the compiled user defined codes to the storage S625, and a step of loading the user defined functional blocks S627.

The step of compiling the user defined codes S621 is a step of compiling the user defined codes into codes executable directly in the baseband accelerator of the terminal in the case that the user defined codes included in the downloaded application package 500 are not codes executable directly in the baseband accelerator 330 but source codes, and generating the user defined functional blocks. Also, if the user defined codes are encrypted, the user defined codes are compiled after being decoded in the step S621.

Also, the step of installing the compiled user defined codes to the storage S625 is a step of installing the pipeline configuration metadata 530 included in the downloaded application package 500, the user defined functional blocks defined by the user defined codes 510, the radio controller codes 520, and the standard functional block which include standard command instruction codes based on the predefined standard baseband interface to the storage of the terminal.

The step of loading the user defined functional blocks S627 is a step of loading the user defined functional blocks defined by the user defined functional blocks included in the downloaded radio application package 500 directly to the baseband accelerator 330. At this time, if the user defined codes 510 are codes executable for the baseband accelerator 330, the user defined functional blocks defined by the user defined codes 510 may be loaded to the baseband accelerator 330 directly without the step of compiling user defined codes S621.

Figure 8:
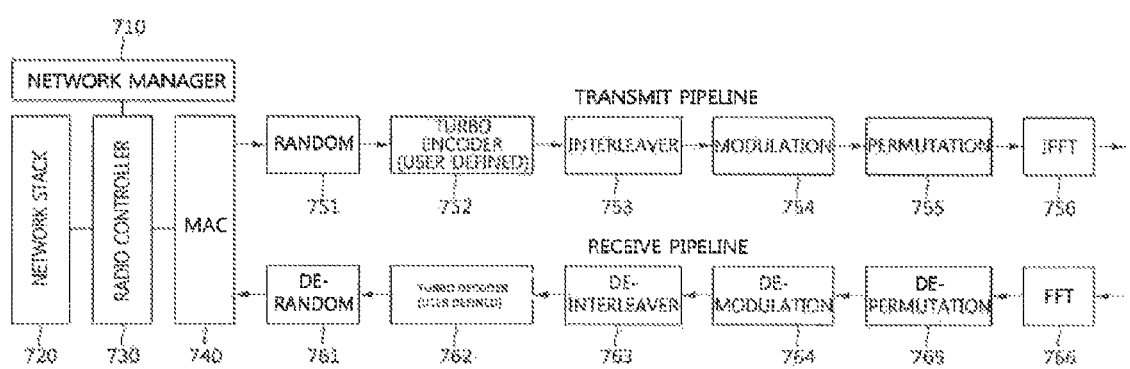
FIG. 8 is a block diagram to show an operation example of radio application in a terminal according to an example embodiment of the present invention.

FIG. 8 is a block diagram to show an operation example of radio application in a terminal according to an example embodiment of the present invention.

Referring to FIG. 8, a constitution of a pipeline depicting operation procedures of functional blocks is shown, when a radio application adopting an Orthogonal Frequency Division Multiplexing (OFDM) is implemented in a terminal without a separate voice channel.

In the example of FIG. 4, a turbo encoder 752 and a turbo decoder 762 are implemented in the form of user defined functional block, other blocks 751, 753~756 of a transmit pipeline 750, and other blocks 761, 763~766 of a receive pipeline 760 are implemented in the form of standard functional block.

Meanwhile, the transmit pipeline may process data transmitted by a MAC 740, and the receive pipeline may process receive data and transmit the processed data to the MAC 740. Here, the radio controller 730 may take a role of exchanging data between the MAC 640 and the network stack 720. Also, the radio controller 730 may provide interfaces corresponding to control commands of a network manager 710 embedded in an operation system (OS), and thereby may receive the control commands from the network manager 710. The network manager 710 may be configured to present context information on radio signals such as transmit/receive signal qualities and a signal strength to an user by visualizing them, or to transfer control information such as information on access channel and radio signal encryption algorithm selected by the user to the radio controllers, so as to perform controlling radio signal according to intention of the user.

Figure 9:
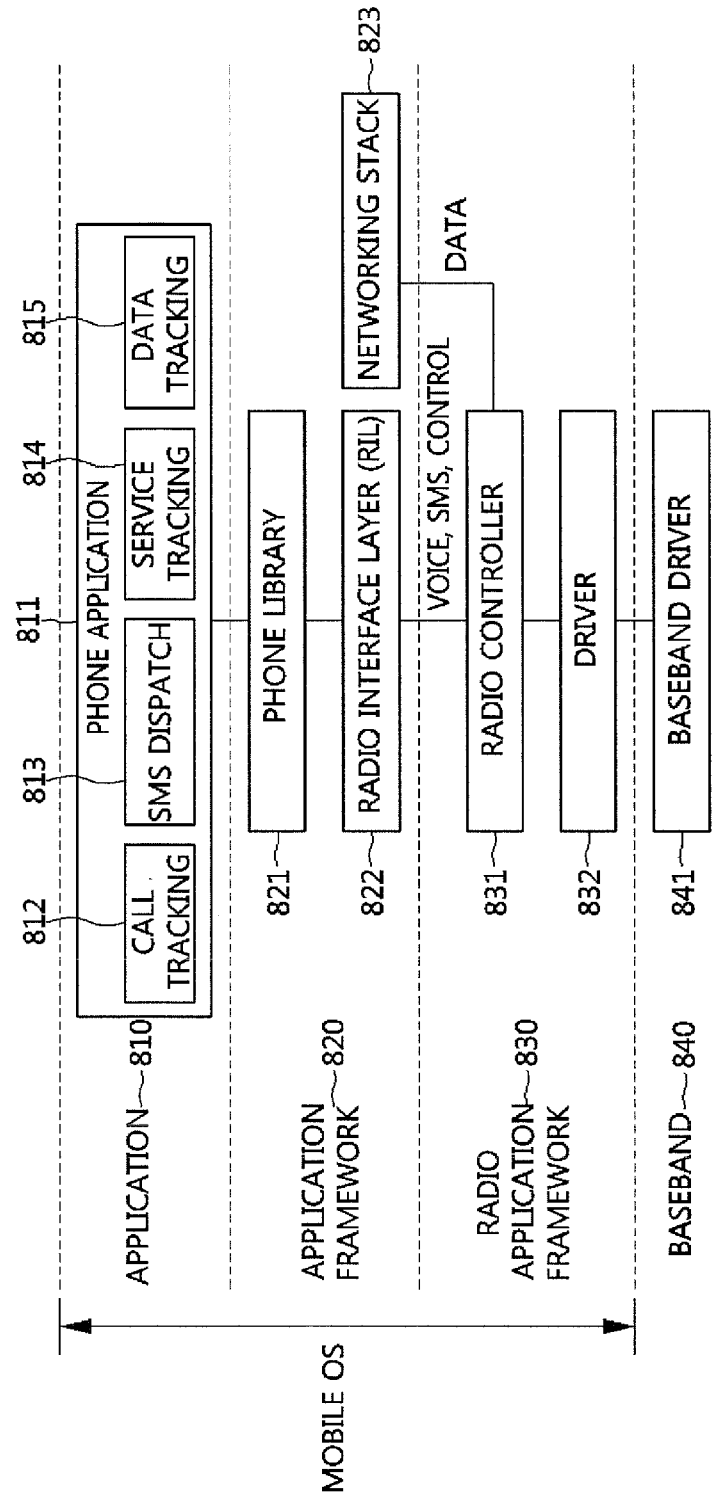
FIG. 9 is a block diagram to show an operation example of radio application in a terminal according to other example embodiment of the present invention.

FIG. 9 is a block diagram to show an operation example of radio application in a terminal according to other example embodiment of the present invention.

Referring to FIG. 9, an operation example of radio application implemented in a terminal with a separate voice channel.

Hereinafter, an interworking operation between a radio controller and internal functions of a mobile operation system operating in an application processor will be explained by referring to FIG. 9.

Generally, in the mobile OS, a phone application may perform functions of telephone such as transmitting and receiving voice of short messaging service (SMS) messages in the terminal. As a usual, a call tracking function 812 which tracks call history and notifies it to a user in addition to voice call function, a SMS dispatch function 813 of transmitting and receiving SMS messages, and a data tracking function 815 of notifying an amount of data transmitted and received may exist within the phone application. These functions of the phone application 811 may be implemented based on a phone library 821 provided by the mobile OS, and the phone library 821 may transfer commands related to control on a baseband processor 841 to a radio interface layer (RIL) layer 822.

A radio controller 831 may transfer signal for controlling the baseband processor 841 according to a wireless network control signal and a voice control signal of the mobile OS 800. Also, the radio controller 831 may transmit voice data received from the baseband processor 841 to the phone application 811 and receive voice data received from the phone application 811 to the baseband processor 841, when signals transmitted to and received from the baseband processor 841 are voice data. Otherwise, the radio controller 831 may transmit data received from the baseband processor 841 to a network stack 823 and receive data received from the network stack 823 to the baseband processor 841, when signals transmitted to and received from the baseband processor 841 are packet data. Thereby, voice call function and wireless networking function may be provided to the user of the terminal at the same time.

Also, the radio controller may further include some upper layer functions of a MAC according to radio signal supported by a radio application. Referring to FIG. 5, by connecting the radio controller 831 and the RIL 822, an application framework 820 and a radio application framework may be configured so that the baseband processor 841 is controlled by the radio controller 831 according to control commands of the RIL 822.

Accordingly, by connecting the radio controller customized and prepared for each radio application and the RIL 822, a phone application independent on the radio application may control the baseband processor 841 dependent on the radio application via the radio controller 831. Therefore, the above-described functions of phone application may be performed persistently without any change of the phone application, even when the radio application is changed.

Figure 10:
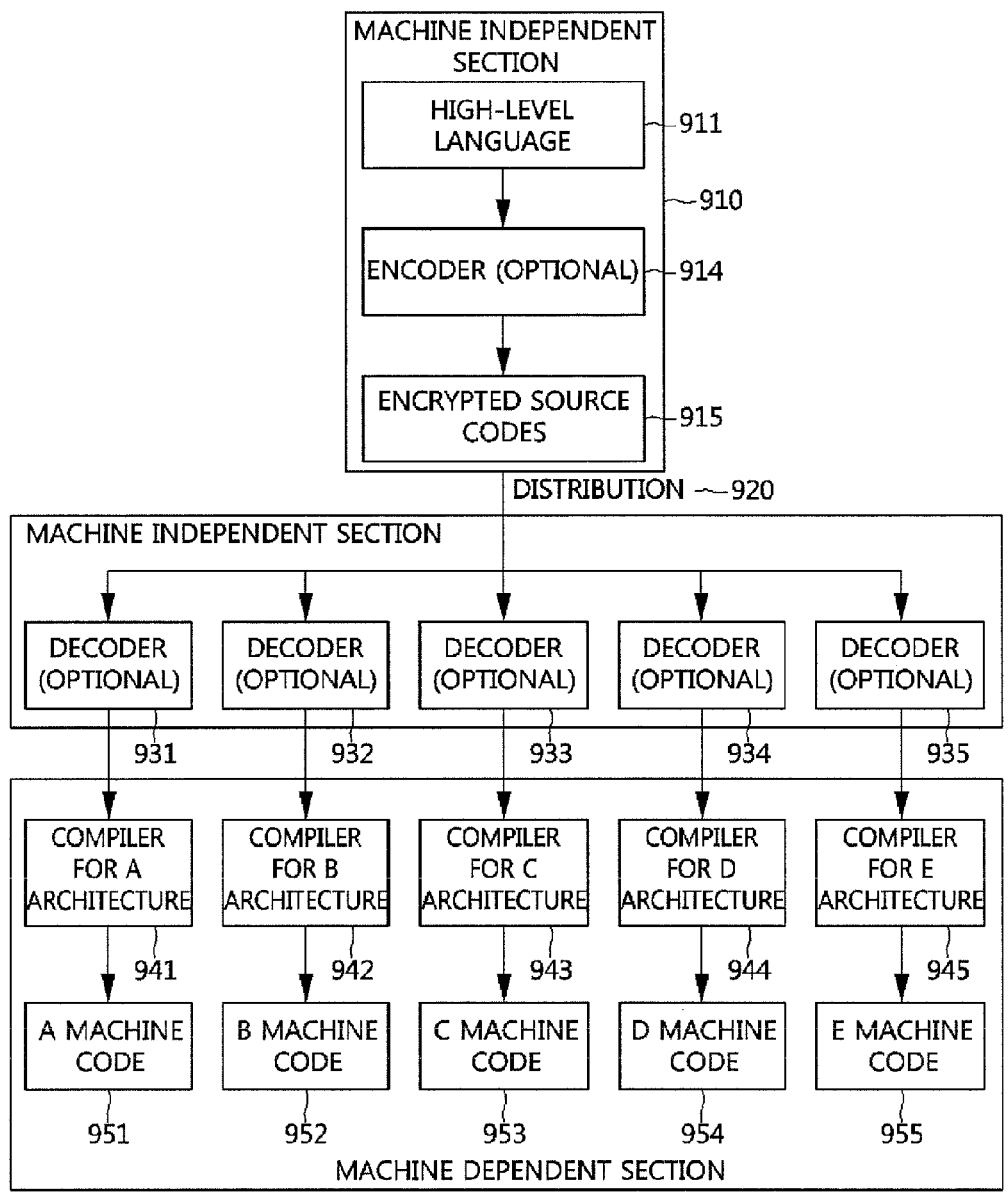
FIG. 10 is a block diagram to explain a procedure of distributing radio application including user defined codes in source code form according to an example embodiment of the present invention.

FIG. 10 is a block diagram to explain a procedure of distributing radio application including user defined codes in source code form according to an example embodiment of the present invention.

Referring to FIG. 10, the user defined codes 911 may be written in high-level language such as C or C++ during development of the radio application. Optionally, the user defined codes may be converted into encrypted source codes 915 by an encoder 914.

The encrypted source codes 915 generated in the above-described manner may be distributed to each terminal as included in radio application package. In the procedure of installation to the terminal, the encrypted source codes may be converted to machine codes 951~955 executable in a modem hardware embedded in the terminal by a decoder 930 and compilers 941~945. Since the compilers 941~945 are required to generate machine codes optimized for a modem hardware embedded in the terminal, the compilers 941~945 are dependent on the modem hardware. Thus, suppliers of modem hardware may produce compilers optimized to their modem hardware, and provide them to radio application developers.

Figure 11:
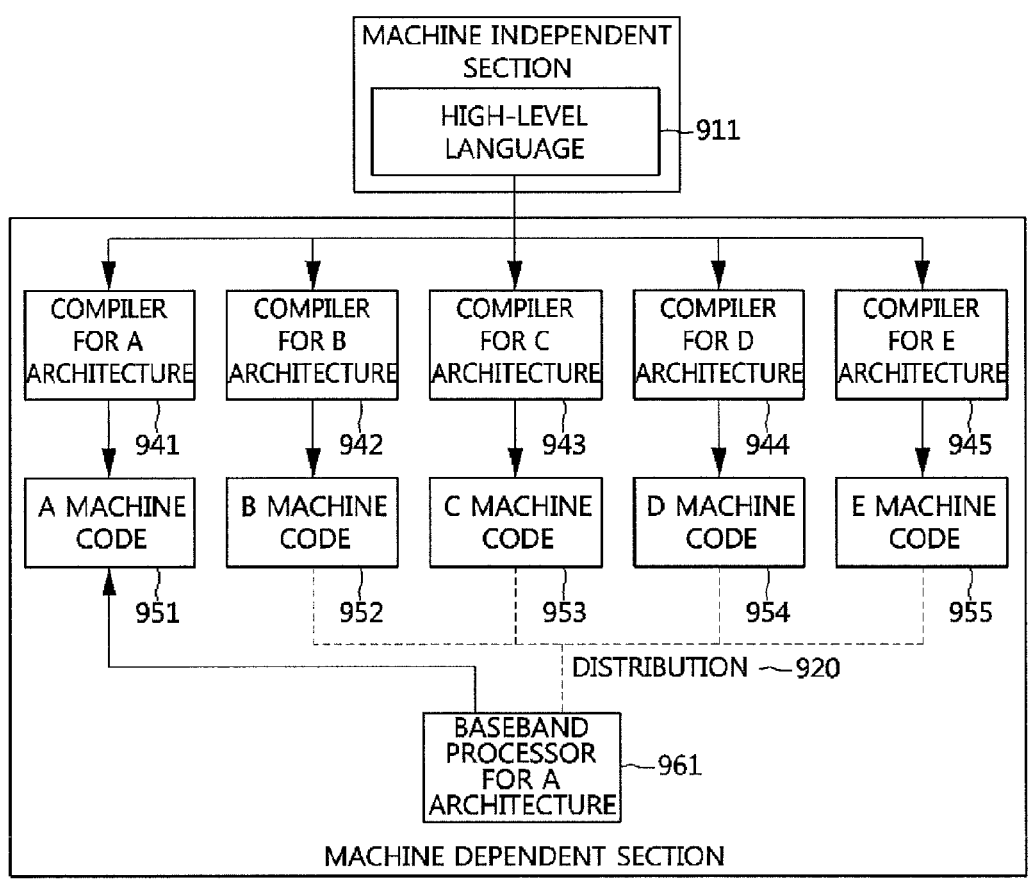
FIG. 11 is a block diagram to show a procedure of distributing radio application including user defined codes in source code form according to another example embodiment of the present invention.

FIG. 11 is a block diagram to show a procedure of distributing radio application including user defined codes in source code form according to another example embodiment of the present invention.

Referring to FIG. 11, the user defined codes 911 may be written in high-level language such as C or C++ during development of the radio application, may be compiled into executable machine codes 951~955 by one of compilers 941~945, suitable for corresponding baseband processor. These machine codes 951~955 may be packaged to respective radio application package for each, and the radio application packages may be uploaded to a radio application server. The terminal may download the radio application operable in its baseband processor 961. Thus, suppliers of modem hardware may produce compilers 941~945 optimized to their modem hardwares, and provide them to radio application developers.

Figure 12:
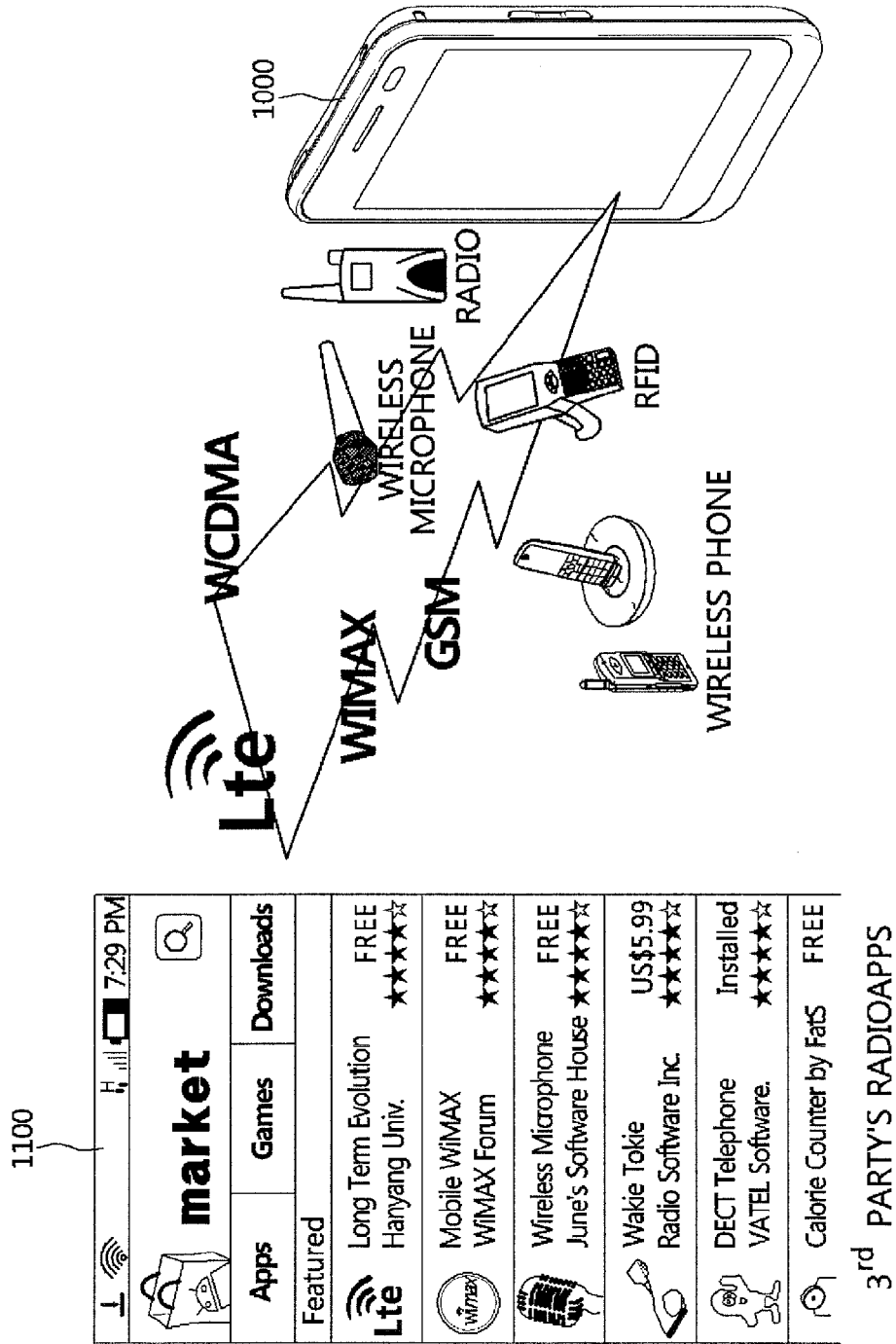
FIG. 12 is a conceptual diagram to show an example of on-line store trading radio applications according to the present invention.

FIG. 12 is a conceptual diagram to show an example of on-line store trading radio applications according to the present invention.

Referring to FIG. 12, the software defined radio terminal 1000 according to an example embodiment of the present invention may select one of radio applications supporting such as Long term Evolution (LTE), Wideband Code Division Multiple Access (WCDMA), Worldwide Interoperability for Microwave Access (WiMAX), Global System for Mobile Communications (GSM), and Radio-Frequency Identification (RFID) in the on-line store 1110, download the selected radio application and operate according to the communication mode of the downloaded radio application independently on the modem chip embedded in the terminal. Also, radio applications which can be selected by the terminal may include a radio application making the terminal operate as a walkie-talkie, a wireless microphone, or a wireless phone.

While the example embodiments of the present invention and their advantages have been described in detail, it should be understood that various changes, substitutions and alterations may be made herein without departing from the scope of the invention.

The invention claimed is:

1. A radio terminal being configured according to a radio application,
wherein the radio terminal includes a nontransitory storage in which at least one functional block is installed, a compiler, a microprocessor, and at least one baseband accelerator,
wherein the microprocessor is configured to read out codes including a radio controller layer transferring control commands for controlling the baseband accelerator and information to be transmitted from an upper layer to the baseband accelerator and transferring information received from the baseband accelerator to the upper layer and a baseband driver layer enabling an interface between the radio controller layer and the baseband accelerator from the storage, and to execute the codes,
wherein the microprocessor is further configured to load the at least one functional block from the storage to the at least one baseband accelerator for performing the radio application,
wherein a compiler is configured to compile the at least one functional block in form of source code into an executable code, and install the executable code into the storage, and
wherein the at least one function block loaded into the at least one baseband accelerator includes a baseband control functional block controlling the at least one baseband accelerator in real time,
wherein the at least one functional block is a standard functional block in which standard instruction commands defined based on a standard baseband interface are specified, or an user-defined functional block provided from a supplier of the radio application,
wherein the microprocessor loads a loader configured to load the at least one functional block from the storage and relocate the at least one functional block based on predefined pipeline configuration metadata, and to execute the loader, and
wherein the loader configures a pipeline defining an operation sequence of the at least one functional block loaded based on the pipeline configuration metadata, and transfers configuration information of the pipeline to the baseband control functional block, and the baseband control functional block controls the at least one baseband accelerator in accordance with the pipeline.

2. The terminal of claim 1, wherein the radio controller layer, the user-defined functional block, and the pipeline configuration metadata are downloaded from an application server, and installed to the terminal.

3. The terminal of claim 2, further include a decoder decoding the user-defined functional block in source code form which is downloaded from the application server as encrypted.

4. The terminal of claim 1, wherein the standard functional block is defined by a standard baseband application programming interface (API) header file.

5. The terminal of claim 4, wherein the user defined functional block includes at least one baseband digital signal processing function which is not implemented in the standard functional block defined by the standard baseband application programming interface (API) header file.

6. The terminal of claim 5, wherein the pipeline configuration metadata includes information on connections between the standard functional block defined by the standard baseband application programming interface (API) header file and the user-defined functional block, and information on initial configuration values for attributes of each of the functional blocks.

7. A processor-implemented method of distributing a radio application, the method comprising:
encrypting user-defined codes defining functional blocks for implementing a specific radio application;
generating an application package including the user-defined codes, radio controller codes configured to transfer control commands for controlling the functional blocks and information to be transmitted from an upper layer to the functional blocks, and to interface with an Operating System (OS) of a terminal, a pipeline configuration metadata specifying the functional blocks for implementing the specific radio application and connections between the functional blocks for implementing the specific radio application; and
uploading the generated application package to an application distribution server,
wherein the application package is downloaded to a software-defined radio (SDR) terminal comprising a microprocessor and at least one baseband accelerator, and
wherein the radio controller code is executed by the microprocessor, and the function blocks are loaded to the at least one baseband accelerator in order to re-configure the at least one baseband accelerator.

8. The method of claim 7, wherein the user-defined codes are in source code form, or in executable code form executable in the terminal.

9. The method of claim 7, wherein the functional block defined by the user-defined code is related to implementation of baseband digital signal processing function which is not implemented in the standard functional block defined by the standard baseband application programming interface (API) header file.

10. The method of claim 7, wherein the pipeline configuration metadata includes information on connections between the standard functional block defined by the standard baseband application programming interface (API) header file and the functional block defined by the user-defined code, and information on initial configuration values for attributes of each of the functional blocks.

11. A processor-implemented method of installing a radio application, performed in a software defined radio terminal comprising a microprocessor and at least one baseband accelerator, the method comprising:
Downloading, from a distribution server, an application package including user-defined codes defining functional blocks for implementing the radio application, radio controller codes configured to transfer control commands for controlling the functional blocks for implementing the radio application and information to be transmitted from an upper layer to the functional blocks, and to interface with an Operating System (OS) of a terminal, a pipeline configuration metadata specifying the functional blocks for implementing the specific radio application and connections between the functional blocks for implementing the specific radio application;
installing the radio controller codes and the user-defined codes into a nontransitory storage of the terminal, by referring the pipeline configuration metadata; and decoding the use-defined codes when the user-defined codes are encrypted, wherein the radio controller code is executed by the microprocessor, and the function blocks are loaded to the at least one baseband accelerator in order to re-configure the at least one baseband accelerator.

12. The method of claim 11, wherein, when the user-defined codes are not executable codes for a baseband accelerator of the terminal, the installing the radio controller codes and the user-defined codes into a storage of the terminal further includes compiling the user-defined codes into executable codes for the baseband accelerator, and storing the compiled executable codes in the storage.

13. The method of claim 11, wherein the functional block defined by the user-defined codes is related to implementation of baseband digital signal processing function which is not implemented in standard functional blocks defined by a standard baseband application programming interface (API) header file.

14. The method of claim 13, wherein the pipeline configuration metadata includes information on connections between the standard functional block defined by the standard baseband application programming interface (API) header file and the functional block defined by the user-defined code, and information on initial configuration values for attributes of each of the functional blocks.

* * * * *